No. 73,972. PATENTED FEB. 4, 1868.
M. HAYDEN.
SEEDING CULTIVATOR.
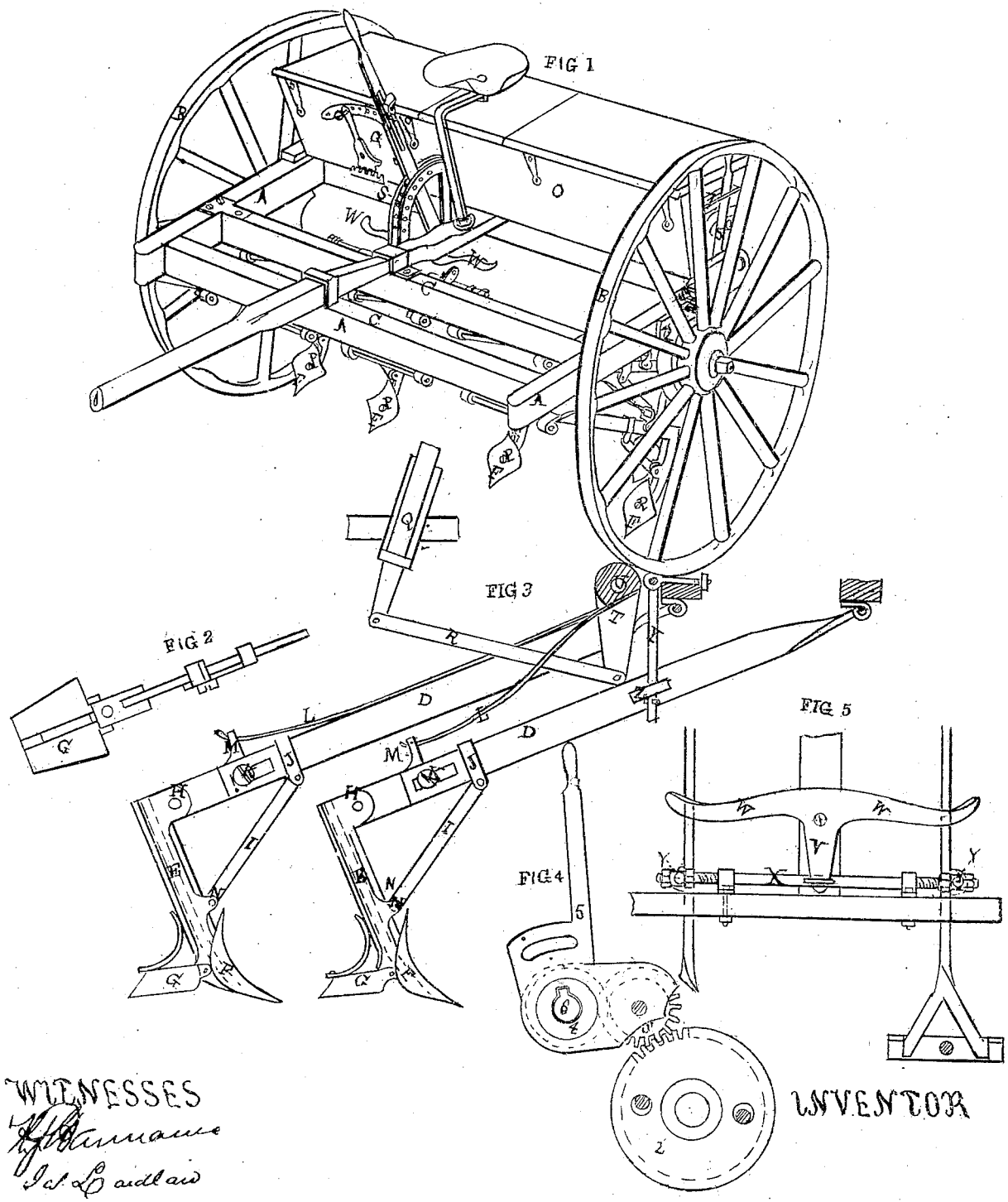
WITNESSES
INVENTOR

United States Patent Office.

MARTIN HAYDEN, OF DETROIT, MICHIGAN.

*Letters Patent No. 73,972, dated February 4, 1868.*

IMPROVEMENT IN SEEDING-CULTIVATOR.

The Schedule referred to in these Letters Patent and making part of the same.

Know all men that I, MARTIN HAYDEN, of Detroit, in the county of Wayne, and State of Michigan, have invented a new and useful Improvement in a Seeding-Cultivator; and I do declare that the following is a true and accurate description thereof, reference being had to the accompanying drawings, and to the letters of reference marked thereon, and being a part of this specification.

Figure 1 is a perspective view of my invention.

Figure 2 is a rear view of the covering-plough.

Figure 3 is a side view, partially in section, of the bars and their attachments.

Figure 4 is a view of the apparatus for throwing into and out of gear the working parts of my cultivator.

Same letters refer to like parts in each figure.

The advantages my invention possesses over other devices for a like purpose, in my own opinion, are these: First, it is so constructed that any appropriate seeding-attachment can be applied, thereby saving the expense of a separate seeding-machine; second, the superior merit of the machine as a cultivator arises from the peculiar method of hanging the shovels, from the facility with which they can be raised entirely out of the ground or set to any desired depth; also, that they can be allowed to follow their own depth, thus passing over uneven ground without being buried in the ground or throwing a heavy draught upon the team.

It may also be used as a corn-cultivator, by taking out the centre shovel and fastening the two teeth on either side next to the centre tooth or shovel, as far apart as may be desired, and running straddle of the rows, as in other corn-cultivators.

Having thus set forth the advantages, I will now describe the construction of my invention, so that those skilled in the art can manufacture them, especial reference being had to the drawings which form a part of this specification.

A is a proper frame, to which are attached the working parts of my cultivator, and to which are also attached the wheels B by proper arms. To the two bars C of the frame, and upon their under side, are attached alternately the bars D, to the other extremity of which are attached the hollow standards E, upon the bottom of which are fastened the shovels F and the covering-shovels G. The standards E are attached to the bars D by hinged joints, H, and the "set" or angle at which they are required is determined by the braces I and clasp J, which slides upon the bar D, and is held in place by the adjusting slotted plate and bolt K. L are springs, the rear end of which pass through slotted projections, M, upon the bars D, while the forward end of the same is attached to a proper bar behind the inner bar C. The braces I are attached to the standard at N by a wooden pin, so that if any tooth strikes such an obstruction as would be likely to break it, the wooden pin will give way and allow the tooth to clear itself. The standards E are made hollow, and may be connected to the seed-box O, when required, by flexible tubes of a proper description, to convey the seed from the seed-box to the standards, whence it drops to the ground through the orifice through the standards into the opening in the ground caused by the shovels F, when the passage of the covering-shovels G covers the seed with earth. The shovels F are fastened to the standards E by proper bolts, P, which pass through the centre of the standards. The seed, in dropping through the orifice in the standards, strikes these bolts P, and is scattered much more than on being delivered in the ordinary way through similar standards in other machines. The covering-shovels G are held down to their work by a proper spring-brace running from the top of the shovel to the back side of the standard. Q is a lever, attached to the arm R, and working in the double quadrant S, and by which the teeth are raised out of or allowed to go into the ground at any desired depth, the other end of the arm R being attached to a pitman-arm, T, which is attached to the rocking-bar U, placed immediately behind the rear bar C of the frame. W is a vibrating-lever, which acts as a foot-rest, and at the same time will guide the shovels on either side of the centre one when the machine is used as a corn-cultivator.

Figure 5 shows this attachment for governing the two shovels above referred to, and the same letters indicate like parts as in the other figures.

W is the vibrating-lever, connected by the arm V to the rod X, which is adjustable by means of proper screws and nuts, and which is attached to the two shovels above referred to. The pins Y are attached to the ends of the rod X, and pass through ears Z on the bars D, which carry the two teeth referred to, for the purpose of steadying and guiding them as they are moved by the vibrating-lever or treadle W. 2 is a gear-wheel, attached to one of the hubs. 3 is a pinion, which meshes into the wheel 2, and also meshes into the pinion 4, which is attached to a proper feed-shaft, 6, in the seed-box. 5 is a lever, working in the rectangular slot 7, which is provided with proper catches to hold it in place. By throwing the lever to the forward end of the rectangular slot, it throws into gear the pinion 3 and gear-wheel 2, by which motion is given, through the pinion 4, to the shaft 6 whenever it is desired to use the cultivator for seed-sowing. Pushing the lever to the rear end of the rectangular slot throws the pinion 3 out of gear. The two pinions 3 and 4 are enclosed in a proper cap, which is attached to the end of the seed-box.

The seed-box should be so constructed that it may readily be attached or detached to the frame of the cultivator when required.

What I claim as my invention, and desire to secure by Letters Patent, is—

1. The springs L, when arranged and operating substantially as and for the purposes set forth.

2. The arrangement of the treadle or vibrating-lever W, the arm V, and rod X, provided with the adjustable screws and nuts, the pins Y, and the ears Z, for the purpose described.

3. The covering-shovels G, provided with a proper spring, when operating substantially as and for the purposes specified.

4. The combination and arrangement of a seeding-cultivator, combining the above-recited parts, with the frame A, the wheels B, the bars of the frame C, the bar behind the rear bar C, the hollow standards E, hung upon the bars D, the shovels F and covering-shovels G, the hinged joints H, the braces I, clasps J, the adjusting slotted plates and bolts K, the slotted projections M, the bolts P, the lever Q, the arm R, the quadrant S, the pitman-arm T, the rocking-bar U, the vibrating-lever or treadle W, with its attachments, the gear-wheel 2, the pinions 3 and 4, the lever 5, and the shaft 6, when constructed and operating substantially as herein set forth.

MARTIN HAYDEN.

Witnesses:
H. G. HANNAMAN,
JAS. LAIDLAW.